H. H. MAY.
Plow.
No. 4,482.
Patented Apr 25. 1846.
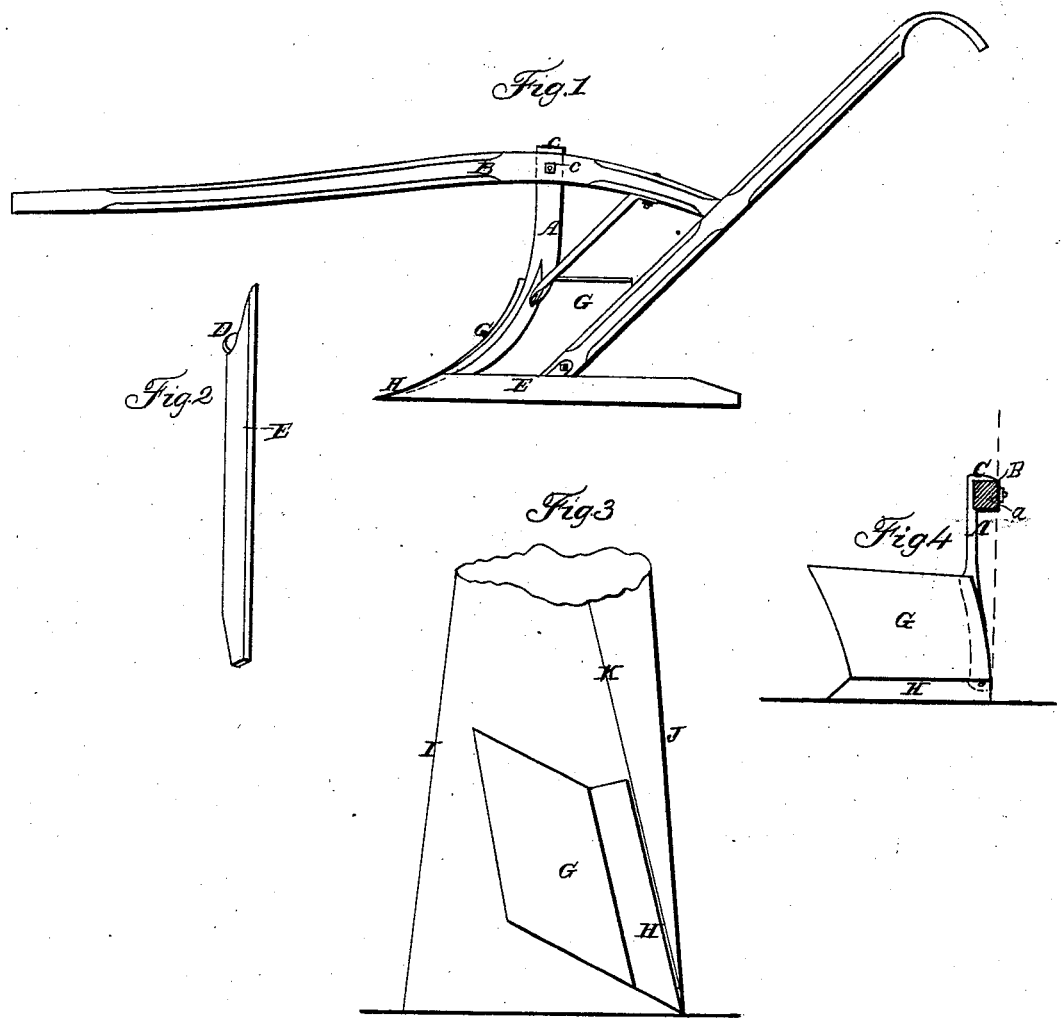

UNITED STATES PATENT OFFICE.

H. H. MAY, OF GALESBURG, ILLINOIS.

IMPROVEMENT IN PLOWS.

Specification forming part of Letters Patent No. 4,482, dated April 25, 1846; antedated January 27, 1846.

*To all whom it may concern:*

Be it known that I, HARVEY H. MAY, of Galesburg, county of Knox, and State of Illinois, have invented a new and useful Method of Making or Constructing Plows; and I do hereby declare that the following is a full and exact description.

The nature of my invention consists in making a lip or projection on the landside, fitted between the share and point of the plow-post or standard to prevent the share from cleaving or separating from the landside; in inclining the plow-post to the right from the landside, and passing to the right side of the beam for a right-hand plow and to the left side of the beam for a left-hand plow, having the top or upper end of the post formed in an angle or elbow to project across, or partly across, the top of the beam, and in giving to the mold-board a conical form, making the plow draw easy and do the work with great perfection.

To enable others skilled in the art to make and use my invention, I will proceed to describe its construction and operation.

A, Figures 1 and 4, represents a plow-post, inclining to the right for a right-hand plow and to the left for a left-hand plow, passing up the side of the beam B or let into the beam the thickness, or part of the thickness, of the post, the upper end of the post made with an angle, elbow, or projection, C, extending across, or partly across, the top or upper side of the beam, and the post and beam held together by a small bolt, c, passing through the beam and post, thereby saving time in making the plow and retaining the strength of the beam. By this mode the plow can be set to or from land in making, or afterward, with almost any degree of exactness.

D represents a lip or projection extending from the landside E sufficient to connect with the point of the plow-post.

F, Fig. 3, represents a semi-cone, by which the conic form of the mold-board and share is illustrated. For a plow for ordinary purposes and of ordinary size, twenty-eight inches may be the base of the cone, and the height or apex one hundred and forty inches, although the angle of the cone may vary according to the lightness or compact and heavy nature of the soil. The mold-board G and the share H are supposed to be placed on the cone in a diagonal position. Thus I and J represent the sides of the semi-cone, and K a line commencing at the extremity of the base of the cone, and departing from the line J of the cone two and a half inches in sixteen inches, inclining this line to the left on the cone for a right-hand plow and to the right for a left-hand plow. Now place the point of the share H at the extremity of the base of the cone and the edge of the share on this diagonal line K, and the share H and the mold-board G made to conform to the cone. The angle or degree of departure of the edge of the share from the line of the cone may vary according to the soil and size of the plow, or the edge of the share may be brought to the line J of the cone. The rear outer corner and edge of the share are formed so as to set even on a level surface when the plow is put together. The conic form of the mold-board and share gives great ease to the draft of the plow and great perfection of the work in covering weeds, straw, and rubbish, and leaves the ground in a good condition for subsequent cultivation. I use the same conic shape when the mold-board and share are of but one piece; but this shape may not extend to the extreme edge of the cutting part in every case.

What I claim as my invention, and desire to secure by Letters Patent, is—

Extending the standard or post of the plow above and lapping over the beam, for the purposes and in the manner herein described.

HARVEY H. MAY. [L. S.]

Witnesses:
 ERASTUS H. STRONG,
 PARDON SISSON.